June 11, 1935.　　　　L. A. MEACHAM　　　　2,004,613
PHASE SHIFTING APPARATUS
Filed Aug. 23, 1933　　　　2 Sheets-Sheet 1

INVENTOR
L. A. MEACHAM
BY
E. V. Griggs
ATTORNEY

June 11, 1935.　　　L. A. MEACHAM　　　2,004,613
PHASE SHIFTING APPARATUS
Filed Aug. 23, 1933　　　2 Sheets-Sheet 2

INVENTOR
L. A. MEACHAM
BY
E. V. Griggs
ATTORNEY

Patented June 11, 1935

2,004,613

UNITED STATES PATENT OFFICE 2,004,613

PHASE SHIFTING APPARATUS

Larned A. Meacham, Montclair, N. J., assignor to Bell Telephone Laboratories, Incorporated, New York, N. Y., a corporation of New York Application August 23, 1933, Serial No. 686,352

17 Claims. (Cl. 178—44)

This invention relates to phase shifting apparatus and more particularly to a network from which may be obtained an alternating potential of constant amplitude the phase angle of which may be continuously varied through an unlimited range.

The principal object of the invention is to shift the phase of an alternating potential source.

Another object is to provide a source of alternating potential which is constant in amplitude but the phase of which may be continuously varied throughout an unlimited angular range.

Another object is to simplify the construction and reduce the cost of manufacturing variable phase shifters.

A feature of the invention is a four-terminal variable phase shifter having a unitary control, the input impedance and the output impedance of the network remaining substantially constant regardless of the setting of the variable circuit elements.

Another feature is a variable phase shifter the phase angle of which is directly proportional to the angular displacement of the unitary control.

Another feature is a group of four variable capacitors comprising four sets of stator plates and only two sets of rotors, both sets of rotors being mounted in quadrature on a common shaft and each working between two sets of stators.

Still another feature of the invention is a variable capacitor having rotors so shaped that the capacitance varies sinusoidally.

There are many uses in transmission circuits for a four-terminal phase shifting network which will provide a source of alternating potential which is constant in amplitude but the phase angle of which may be continuously varied through an unlimited range. It is also desirable that both the input impedance and the output impedance of the network should be substantially constant, regardless of the setting of the variable elements, in order to minimize reflection losses at the junction points where the network is connected to other apparatus. Another requisite is that the network should be inexpensive to construct and simple in operation. Heretofore, such a phase shifter has required a number of variable inductors or a number of variable resistors which must be operated in unison. This type of inductor is expensive to build, and variable resistors are unsatisfactory in operation because of the difficulty in making positive electrical contact with them.

In accordance with the present invention there is provided a phase shifting network which will meet the above requirements and yet is compact, inexpensive to build and simple to operate. The only variable elements required are a series of four variable capacitors having four sets of stator plates and only two sets of rotors, both sets of rotors being mounted in quadrature on the same shaft and under a unitary control. The network has a pair of input terminals to which a source of alternating potential may be connected and a pair of output terminals from which may be obtained an alternating potential constant in amplitude but having a phase angle variable through an unlimited range, the phase of the output voltage being directly proportional to the angular displacement of the rotors of the component variable capacitors.

The nature of the invention will be more fully understood from the following detailed description and by reference to the accompanying drawings, of which:

Figure 1:
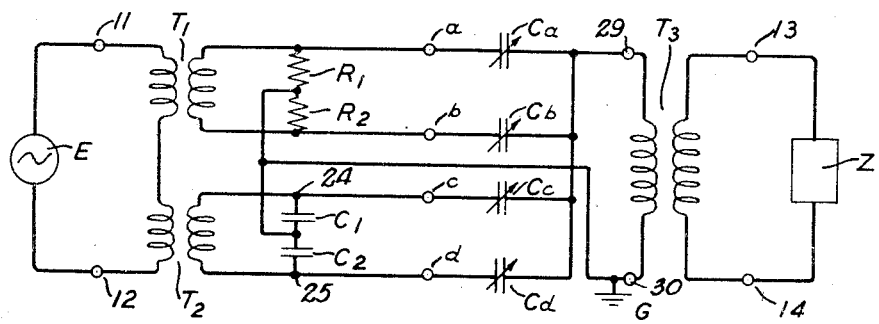
Fig. 1 is a schematic representation of one embodiment of the invention in a network for obtaining the desired shift in phase of an alternating potential source.

The phase shifting network shown in Fig. 1 has a pair of input terminals 11, 12 to which any suitable source E of alternating potential may be connected, and a pair of output terminals 13, 14 from which may be obtained a potential difference constant in amplitude but having any desired phase angle with respect to the source. Any constant load impedance Z may be connected to the output terminals 13, 14 without affecting either the constancy of the amplitude of the output potential or the proportionality between the phase angle and the angular displacement of the unitary control, described hereinafter. The input transformers $T_1$ and $T_2$ have like characteristics and are designed to pass efficiently the frequency $f$ of the source $E$ of electromotive force. The two transformers $T_1$, $T_2$ have their primary windings connected in series, while the secondary of $T_1$ is terminated in the equal series resistances $R_1$, $R_2$ and the secondary of $T_2$ is terminated in the equal series capacitances $C_1$, $C_2$. These resistances and capacitances are related to each other by the expression $$R_1=R_2=\frac{1}{\omega C_1}=\frac{1}{\omega C_2}, \qquad (1)$$

where $\omega=2\pi f$. The common terminal of the resistances $R_1$, $R_2$ and the common terminal of the capacitances $C_1$, $C_2$ are connected to the ground $G$, or are otherwise fixed in potential. The purpose of the portion of the circuit just described is to provide at the points $a$, $b$, $c$ and $d$ four potential differences which, with respect to ground, will be equal in amplitude but will have phase angles spaced at intervals of 90°, the relative phase positions at these points being respectively zero, 180°, 90° and 270°.

The points $a$, $b$, $c$, $d$ are directly connected, respectively, to the stator plates of the four variable capacitors $C_a$, $C_b$, $C_c$ and $C_d$, the capacitances of which are so small that their insertion into the circuit will have negligible effect upon the potentials considered above. In practice it has been found that the operation of the phase shifter is satisfactory when the ratio of the capacitance of $C_1$ to the maximum capacitance of each of the variable capacitors is 10 or greater. The rotors of the variable capacitors are all connected to one terminal of the primary winding of the output transformer $T_3$, the other terminal of the primary being connected to ground. As will be explained hereinafter only two sets of rotors are required, and they may be mounted conveniently upon the same shaft.

Figure 9:
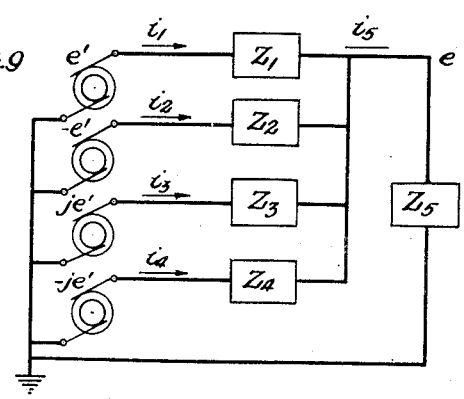
Fig. 9 shows a generalized circuit diagram of the phase shifter.

Fig. 9 shows a generalized circuit diagram of the phase shifter. Sources of alternating potential, with quadrature phase relations, are shown in place of the terminated transformers; the variable condensers and the output transformers are represented by generalized impedances.

The equations for this generalized circuit may be written as follows:

$$i_1=\frac{e'-e}{Z_1}=Y_1(e'-e)$$

$$i_2=\frac{-e'-e}{Z_2}=Y_2(-e'-e)$$

$$i_3=\frac{je'-e}{Z_3}=Y_3(je'-e)$$

$$i_4=\frac{-je'-e}{Z_4}=Y_4(-je'-e)$$

$$i_1+i_2+i_3+i_4=i_5=\frac{e}{Z_5}=Y_5e$$

Therefore:

$$Y_1(e'-e)+Y_2(-e'-e)+Y_3(je'-e)+Y_4(-je'-e)=Y_5e$$

This expression, solved for $e$, gives:

$$e=\frac{e'(Y_1-Y_2+jY_3-jY_4)}{(Y_1+Y_2+Y_3+Y_4+Y_5)} \qquad (2)$$

or $$e=\frac{e'(Y_1-Y_2)}{\Sigma Y_n}+\frac{je'(Y_3-Y_4)}{\Sigma Y_n}$$

It is desired that the phase of $e$ be advanced uniformly with respect to $e'$, the amplitude of $e$ remaining constant, as the impedances of the circuit are varied in some regular manner. This may be accomplished by letting:

$$Y_1=A+B \sin \theta$$
$$Y_2=A-B \sin \theta$$
$$Y_3=A+B \cos \theta$$
$$Y_4=A-B \cos \theta$$

and $Y_5=K$, a constant.

These values substituted in Equation (2) give:

$$e=e'(\sin \theta+j \cos \theta)\left(\frac{2B}{4A+K}\right) \qquad (3)$$

Since the absolute value of $(\sin \theta+j \cos \theta)$ is unity, the amplitude of $e$ is constant, and is given by:

$$E=E'\left(\frac{2B}{4A+K}\right) \qquad (4)$$

The phase relation between $e$ and $e'$ is expressed by the term $(\sin \theta+j \cos \theta)$.

Figure 5:
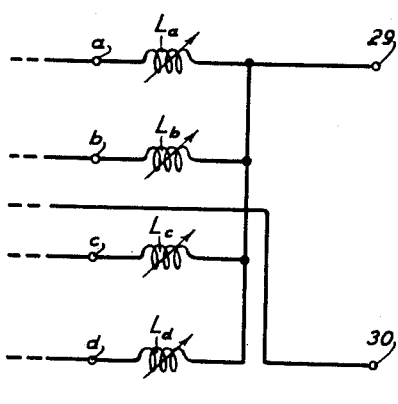
Figs. 5 and 6 represent alternative portions which may be substituted for the part of the network between the points $a$, $b$, $c$, $d$ and points 29, 30 of the network shown in Fig. 1.
Figure 6:
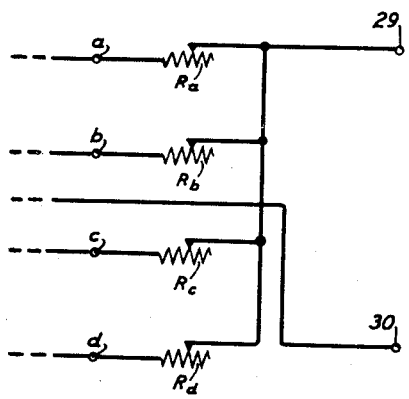

Since $Y=1/Z=2\pi fC$, the requirements on the variation of the admittances, $Y_1$ to $Y_4$, may readily be met with variable condensers having properly shaped plates. The condensers should be designed to have the following characteristics:

$$C_a=A+B \sin (\theta+0°)$$
$$C_b=A+B \sin (\theta+180°) \qquad (5)$$
$$C_c=A+B \sin (\theta+90°)$$
$$C_d=A+B \sin (\theta+270°)$$

where $A$ and $B$ are constants and $\theta$ is the angular position of each of the rotors in degrees. If the rotors are displaced from each other by fixed angles of 90° the reactance of four such condensers connected in parallel will always be a constant, as shown by Equation (4), regardless of the angular position of the rotors. It is this feature of the network which ensures that the output impedance will not be changed when the component capacitances are varied. It is not necessary that the variable impedance elements be capacitances; variable inductors or resistors may be substituted therefor, as shown respectively in Figs. 5 and 6, provided the reciprocals of their inductances or resistances follow sinusoidal variations. In Figs. 5 and 6 the portions of the network to the left of the points $a$, $b$, $c$, $d$ and to the right of the points 29, 30 may be considered to be the same as the corresponding parts shown in Fig. 1. The variable capacitors $C_a$, $C_b$, $C_c$, $C_d$, are replaced in Fig. 5 by the variable inductors $L_a$, $L_b$, $L_c$, $L_d$, and in Fig. 6 by the variable resistors $R_a$, $R_b$, $R_c$, $R_d$. Variable capacitors, however, are the most desirable from a practical standpoint because they are comparatively inexpensive to build.

Figure 3:
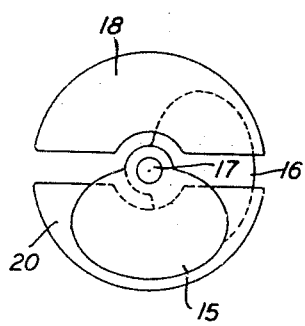
Figs. 3 and 4 illustrate diagrammatically the mechanical arrangement of the four variable capacitors used in the networks shown in Figs. 1 and 2.
Figure 4:
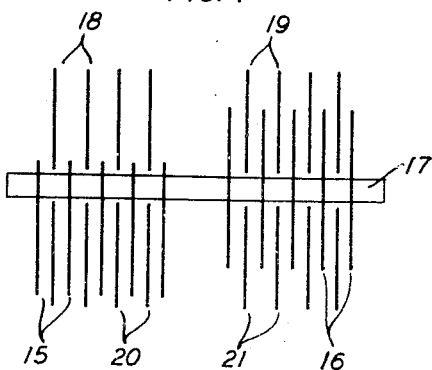

A convenient mechanical arrangement of the four variable capacitors is illustrated diagrammatically in Fig. 3, which is an end view, and in Fig. 4, a side view. Only two sets of rotors 15, 16 are required, and they are mounted in quadrature upon a common shaft 17. Two sets of stator plates 18, 19 are located on one side of the shaft 17 and the other two sets of stators 20, 21 are placed on the opposite side, thus permitting each set of rotors to work between two sets of stators. When the rotors 15, 16 are shaped as shown in Fig. 3 the phase of the output voltage obtainable at the terminals 13, 14 may be continuously varied, through an unlimited range, the phase angle being directly proportional to the angular displacement of the shaft 17.

Figure 7:
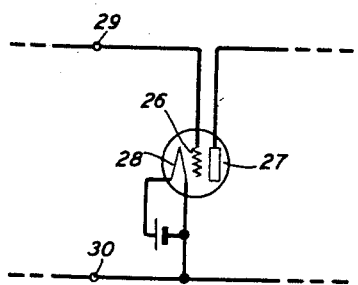
Fig. 7 shows a load of suitable impedance connected directly to the output terminals 29, 30 of the network of Fig. 1.

In order to match the output impedance of the phase shifter, the load Z should have the impedance given by the equation $$Z = \frac{1}{2\omega(C_{max} + C_{min})}, \qquad (6)$$

Where $C_{max}$ and $C_{min}$ are, respectively, the maximum and the minimum capacitances of one of the four variable capacitors. Equation (6) assumes a unity ratio for the windings of the output transformer $T_3$, but other ratios may sometimes be employed advantageously in order to match the load impedance to the output impedance of the phase shifter. Also, in some instances, it may be found desirable to eliminate the transformer $T_3$ and connect the common rotor shaft 17 directly to the grid of a thermionic tube or to other apparatus of suitable impedance. In Fig. 7, for example, the grid 26 of the thermionic tube 27 is connected directly to terminal 29 and the cathode 28 is connected to terminal 30. In Fig. 7 the portion of the network to the left of terminals 29, 30 may be assumed to be the same as shown in Fig. 1.

If desired, the two capacitances $C_1$, $C_2$ of Fig. 1 may be replaced by a pair of equal inductances $L_1$, $L_2$ related to the resistances $R_1$, $R_2$ by the expression $$R_1 = R_2 = \omega L_1 = \omega L_2 \qquad (7)$$

Figure 8:
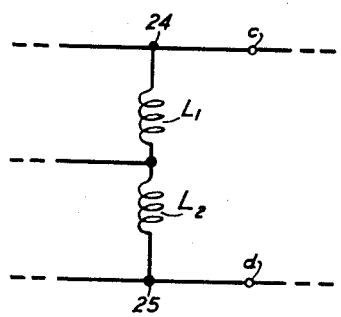
Fig. 8 is an alternative impedance branch which may be substituted for the one shown between points 24, 25 of Fig. 1.

Fig. 8 shows the impedance branch between points 24, 25 of Fig. 1 after the capacitances $C_1$, $C_2$ have been replaced by the inductances $L_1$, $L_2$.

Figure 2:
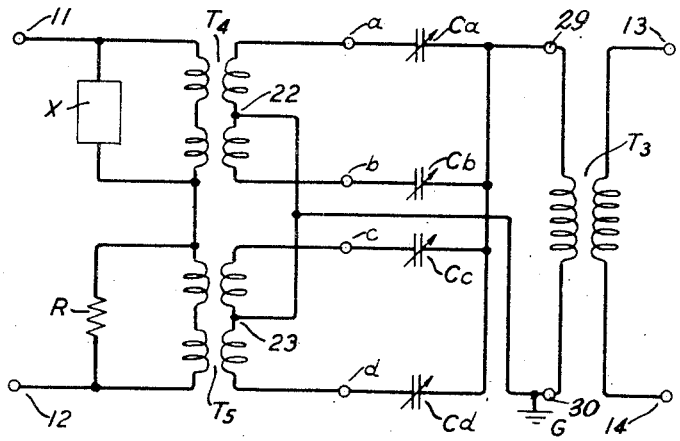
Fig. 2 shows a modification of the network represented by Fig. 1.

Another modification in the circuit of the phase shifter is shown in Fig. 2, in which the portion of the network to the right of the points $a, b, c, d$ is identical with the same part illustrated in Fig. 1. The input transformers $T_1$, $T_2$ are replaced, however, by two transformers $T_4$, $T_5$ which have like characteristics. The primary windings of the transformers $T_4$, $T_5$ are connected in series while their secondaries have center tappings 22, 23 which are connected together and to ground. Across the primary winding of $T_5$ is connected a resistance R and across the primary of $T_4$ is connected a reactance X, the magnitude of which, at the frequency $f$, is equal to R. The reactance X may be either a capacitance or an inductance. The network shown in Fig. 2 functions in exactly the same manner as does the one shown in Fig. 1, but offers the advantage that one resistance and one reactance element are saved.

What is claimed is:

1. In a variable phase shifter, four branches in parallel, each branch comprising a variable capacitor, the rotors of said capacitors consisting of two sets of plates mounted in quadrature on a common shaft, and the capacitance of each of said capacitors having a sinusoidal variation with respect to the angular displacement of said rotors.

2. In a variable phase shifting network, four branches in parallel, each of said branches comprising a variable capacitor, the rotors of each of said capacitors being so shaped that the capacitance of each of said capacitors varies sinusoidally with respect to the angular displacement of said rotors, and all of said rotors being under a unitary control, whereby the parallel reactance of said capacitors remains constant in magnitude for all settings of said unitary control.

3. In a continuously variable phase shifter, four branches in parallel, each comprising a variable capacitor, the rotors of all of said capacitors being mounted on a common shaft, and said rotors being so shaped and so disposed that the reactance of said capacitors connected in parallel is constant in magnitude for all angular positions of said shaft although the capacitance of each of said capacitors varies sinusoidally with respect to the angular displacement of said rotors.

4. In a variable phase shifting network, four branches in parallel, two equal lumped resistances, one located in each of two of said branches, two equal lumped reactances, one located in each of said other two branches, and a variable capacitor in each of said branches, the reactance characteristic of each of said variable capacitors being a sinusoidal curve when plotted against the angular displacement of the rotor associated with said capacitor, the rotors of all of said capacitors being responsive to a unitary control, and the parallel capacitance of said capacitors being constant in magnitude for all settings of said unitary control.

5. A variable phase shifting network comprising four branches connected effectively in parallel, each of said branches comprising a variable inductance element, all of said inductance elements being under a unitary control by an adjustment of which the phase shift in said network may be given any desired angular value, and the impedance of said four parallel branches remaining substantially constant regardless of the setting of said unitary control.

6. In combination, a source of single phase alternating electromotive force constant in amplitude, and a network associated therewith adapted to serve as a source of electromotive force of variable phase, said network comprising two input transformers having their primary windings connected in series with each other and in series with said source, a pair of equal resistances connected across the secondary of one of said transformers, a pair of equal reactances connected across the secondary of the other of said transformers, a pair of output terminals across which the delivered electromotive force is effective, and means for adjusting the output phase while keeping the delivered electromotive force constant in amplitude.

7. In combination with a source of alternating potential, a network for obtaining a potential variable in phase with respect thereto throughout an unlimited angular range comprising a pair of terminals connected to said source, means for establishing four points the potential differences of which, with respect to a point of fixed potential, have the respective phase angles of zero, 90 degrees, 180 degrees and 270 degrees, and four variable capacitors, one of said capacitors being connected between each of said four points and a common point, and the capacitance of each of said capacitors following a sinusoidal variation with respect to the angular displacement of the rotors of said variable capacitors.

8. In combination with a source of alternating potential, a four-terminal network for obtaining a potential constant in amplitude but having any desired phase angle with respect to said source comprising a pair of terminals connected to said source, means for establishing four points the potential differences of which, with respect to a point of fixed potential, have the same amplitude but have the respective phase angles of zero, 90 degrees, 180 degrees and 270 degrees, and four variable impedances under a unitary control, one of said impedances being connected between each of said four points and a common point, and the parallel impedance of said four impedances remaining constant for all settings of said unitary control.

9. In combination with a source of alternating potential, a network for obtaining a potential variable in phase with respect thereto throughout an unlimited angular range comprising a pair of terminals connected to said source, means for establishing four points the potential difference of which, with respect to a point of fixed potential, have the respective phase angles of zero, 90°, 180° and 270°, and a variable capacitor comprising two sets of rotors mounted in quadrature upon the same shaft, two sets of stators on one side of said shaft and two other sets of stators on the opposite side of said shaft, said stators being so arranged that each set of said rotors works between two oppositely disposed sets of said stators, and each of said stators being connected, respectively, to one of said four points.

10. A variable phase shifting network comprising two input transformers and an output transformer, the primary windings of said input transformers being connected in series, the secondary of one of said input transformers being terminated in two parallel branches, the one branch consisting of two equal resistors in series and the second branch consisting of two variable capacitors in series, the secondary of the other of said input transformers being terminated in two other parallel branches, the one branch consisting of two equal reactors in series and the second branch consisting of two other variable capacitors in series, the common terminal of said resistors and the common terminal of said reactors being connected to one terminal of the primary winding of said output transformer, the other terminal of said primary being connected to the rotor of each of said variable capacitors, and said rotors being so shaped that the capacitance of each of said capacitors varies sinusoidally with respect to the angular displacement of said rotors.

11. In combination with a source of periodic potential, apparatus for producing a potential of constant amplitude but variable in phase with respect to said source comprising two input transformers having their primary windings connected in series with each other and in series with said source, a lumped resistance across the primary of one of said input transformers, a lumped reactance across the primary of said other input transformer, the magnitude of said reactance being equal to said resistance at the frequency of said source, an output transformer, a connection from the midpoint of the secondary of each of said input transformers to one terminal of the primary winding of said output transformer, and four variable impedances, one being connected between each of the terminals of the secondaries of said input transformers and the other terminal of the primary of said output transformer.

12. In a continuously variable phase shifter, four branches in parallel, each comprising a variable inductor, all of said inductors being under a unitary control, and said inductors being so designed and associated with said control in such a manner that the reactance of said inductors connected in parallel is constant in magnitude for all settings of said unitary control.

13. In a continuously variable phase shifter, four branches in parallel, each comprising a variable resistor, all of said resistors being under a unitary control, and said resistors being so designed and associated with said control in such a manner that the impedance of said resistors connected in parallel is constant in magnitude for all settings of said unitary control.

14. In combination with a source of alternating potential, a four-terminal network for obtaining a potential constant in amplitude but having any desired phase angle with respect to said source comprising a pair of terminals connected to said source, means for establishing four points the potential differences of which, with respect to a point of fixed potential, have the same amplitude but have the respective phase angles of zero, 90°, 180° and 270°, and four variable capacitances under a unitary control, one of said capacitances being connected between each of said four points and a common point, and the parallel impedance of said four capacitances remaining constant for all settings of said unitary control.

15. In combination with a source of alternating potential, a four-terminal network for obtaining a potential constant in amplitude but having any desired phase angle with respect to said source comprising a pair of terminals connected to said source, means for establishing four points the potential differences of which, with respect to a point of fixed potential, have the same amplitude but have the respective phase angles of zero, 90°, 180° and 270°, and four variable resistances under a unitary control, one of said resistances being connected between each of said four points and a common point, and the parallel impedance of said four resistances remaining constant for all settings of said unitary control.

16. In combination with a source of alternating potential, a four-terminal network for obtaining a potential constant in amplitude but having any desired phase angle with respect to said source comprising a pair of terminals connected to said source, means for establishing four points the potential differences of which, with respect to a point of fixed potential, have the same amplitude but have the respective phase angles of zero, 90°, 180° and 270°, and four variable inductances under a unitary control, one of said inductances being connected between each of said four points and a common point, and the parallel impedance of said four inductances remaining constant for all settings of said unitary control.

17. A variable phase shifting network comprising two transformers and a pair of output terminals, the primary windings of said transformers being connected in series, the secondary of one of said transformers being terminated in a pair of equal resistances, the secondary of the other of said transformers being terminated in a pair of equal reactances, connections from the common terminal of said pair of resistances and from the common terminal of said pair of reactances to one of said output terminals, and four variable impedances, one being connected between each of the terminals of the secondaries of said transformers and the other output terminal.

LARNED A. MEACHAM.